Figure 1:
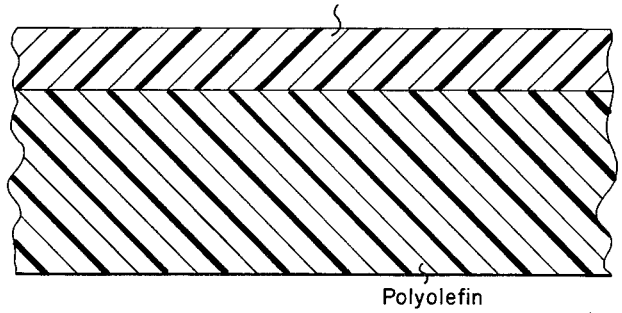

Aug. 3, 1965     D. J. BRIDGEFORD     3,198,692
POLYOLEFIN LAMINATE
Filed Feb. 26, 1963

Douglas J. Bridgeford
INVENTOR.

BY

His Attorney

United States Patent Office 3,198,692
Patented Aug. 3, 1965

3,198,692
POLYOLEFIN LAMINATE
Douglas J. Bridgeford, Danville, Ill., assignor to Tee-Pak, Inc., Chicago, Ill., a corporation of Illinois
Filed Feb. 26, 1963, Ser. No. 261,216
47 Claims. (Cl. 161—188)

This patent application is a continuation-in-part of my copending application, Serial No. 545,568, filed November 7, 1955, now abandoned.

This invention relates to a polyolefin-containing laminate and to a method of making such laminate. More particularly, the invention relates to a laminate containing polyethylene as one lamina in a superbly bonded polyethylene-polymeric material, said polymeric material, containing appreciable amounts of active hydrogen. The invention also relates to a laminate comprising a polyolefin material having a coating-receptive surface coated with an adhesive undercoating or primer coating of a compound, having a plurality of —X=C=Y groups, wherein X is C or N, Y is O,S or NR, and R is hydrogen or monovalent hydrocarbon radical, which is bonded to another coating or lamina of a synthetic resin or active-hydrogen-containing material. To a very significant but not all inclusive extent the invention also relates to a laminate containing polyethylene as one lamina in a polyethylene-cellulosic material laminate, said cellulosic material for the purposes of this invention including cellulose, incompletely substituted cellulose derivatives and natural or synthetic compositions containing appreciable amounts of cellulose.

The inertness of polyolefins, such as polyethylene, polypropylene, polybutene, etc., and their exceptional resistance to acids and alkalis and to many solvent as well have in recent years brought polyolefins into the packaging and coating fields. These uses have been furthered by the fine flexibility, extensibility and abrasion resistance of polyethylene (and analogous polyolefins) but all of these properties notwithstanding, industrial application of polyethylene (and other polyolefins) has been anomalously thwarted by the inertness which seemingly precludes the establishment of a suitable bond, an adhesive layer, coating, or lamina of other materials. Where polyolefins are used as a coating, adhesion may be to rigid plane or irregular surfaces whereas in packaging, the material to which polyolefin adhesion is sought will usually be of a pliable nature.

Additionally, in the field of food packaging where polyolefins are involved, indiscriminate combinations of laminae and adhesive may have undesirable effects due to alterations in the physical properties of the composite film. For example, lamination of a suitable film with various other films may destroy heat sealability or unfavorably alter moisture vapor permeability, both of which are important factors in food packaging.

Accordingly, it is one of the objects of this invention to provide a new and improved composite material of a polyolefin bonded to a synthetic resin, particularly to a material containing active hydrogen.

Another object of this invention is to provide an improved composite material in which a thin coating or lamina is secured by an adhesive to a coating-receptive polyolefin surface.

A further object of this invention is to provide a polyethylene-polymeric material containing active hydrogen, said polyethylene being securely bonded to the active-hydrogen-containing material.

A still further object of the invention is to provide a laminate containing one lamina of polyethylene that is securely bonded to a synthetic resin or other polymeric material containing active hydrogen, such as cellulosic materials including cellulose and substituted cellulose derivatives, paper, cotton, wool, zinc, zein, polyvinyl alcohol, polyvinyl butyral, and amylose.

A still further object of this invention is to provide a new and improved laminate in which a synthetic resin is bonded to a coating-receptive surface on a polyolefin by an adhesive containing a plurality of —X=C=Y groups wherein X is C or N and Y is O,S or NR, wherein R is hydrogen or a monovalent hydrocarbon radical.

A still further object of this invention is to provide a laminate in which the adhesive or primer coating does not impair the suitability of the laminated product for packaging of foodstuffs.

Other objects and features of this invention will be apparent from time to time throughout the specification and claims as hereinafter related.

Figure 2:
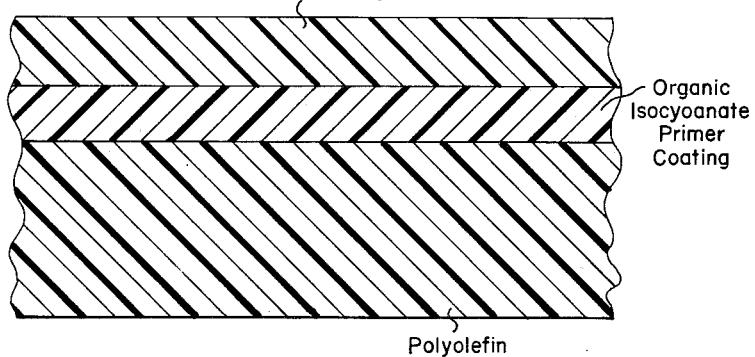

In the accompanying drawings there are shown two preferred embodiments of this invention:

FIG. 1 is a view in cross-section of a coating-receptive polyolefin with an organic isocyanate coating, and FIG. 2 is a view in cross-section of a coating-receptive polyolefin with an organic isocyanate primer coating and a top coating or film of an active-hydrogen-containing synthetic resin or other polymeric material.

The foregoing and related objects are achieved by my invention wherein a polyolefin having a coating-receptive surface, such as a surface-oxidized polyethylene, is bonded to a polymeric material by means of an adhesive containing a plurality of —X=C=Y groups wherein X is C or N and Y is O,S or NR, wherein R is hydrogen or monovalent hydrocarbon radicals. By means of even very thin layers of such adhesive, a bond is established which is stronger that the usual thickness of polyethylene (or other polyolefin) film itself, the bond withstanding boiling of the laminated film in hot water for extended periods.

The polyolefin having a coating-receptive surface is preferably a surface-oxidized polyethylene which is treated by either chemical or physical methods that produce base exchange capacity in at least the surface thereof. The surface-oxidized polyethylene can be used as a coating or as a film lamina as will be subsequently described. Treatments which will oxidize the surface of a polyolefin, such as polyethylene, to render the surface effective in this invention include the brush discharge method, the flame treatment method of U.S. Patent 2,648,097, the process of sulfuric acid-dichromate oxidation of U.S. Patent 2,668,134, halogenation by the action of vaporous chromyl chloride or by the method of U.S. Patent 2,502,-841, ozonation of film in an ozone-rich atmosphere, and sulfuric acid-potassium permanganate oxidation.

Adhesives containing a plurality of —X=C=Y groups groups described above are monomeric or polymeric compounds such as ketenes, thioketenes, isocyanates, isothiocyanates, ketenimines and carbodiamines. The preferred classes are the isocyanates and isothiocyanates which include the vinylarylisocyanates of U.S. 2,468,716, the propenyl isocyanates of U.S. 2,326,287, the allyloxyphenyl isocyanate polymers and copolymers of U.S. 2,647,884, the allyl isocyanate-ethyl acrylate copolymers of U.S. 2,537,064, the meta- and para-styrene isocyanates of U.S. 2,468,713, the alkyd-unsaturated isocyanate described in U.S. 2,503,209, reaction products of bis-phenol and isocyanates or isothiocyanates of U.S. 2,594,979, diisocyanate-modified polyesters containing an excess of isocyanate groups, and polyisocyanate-modified active-hydrogen-containing rubber.

In addition, other compounds useable alone or when reacted with other active-hydrogen-containing materials to form copolymers include ethylene diisocyanate, tetramethylene diisocyanate, hexamethylene diisocyanate, decamethylene diioscyanate, 2,3-dimethyltetramethylene diisocyanate or diisothiocyanate and propylene-1,2, butylene-1,2, and butylene-1,3 derivatives of diisocyanate and disothiocyanate, toluene diisocyanate, diphenylmethane diisocyanate and triphenyltriisocyanate. Other exemplifying aromatic polyisocyanates and isothiocyanates include m-phenylene, p-phenylene, xylylene-1,4 and -1,3; 1-methylphenylene-2,4; naphthylene-1,4; benzene-1,2,4 triisothiocyanate; 5-nitro-1,3 phenylene diisocyanate; 4,4'-diphenylenepropane diisocyanate, and anisole polyisocyanate.

Operative alkylidene derivatives include ethylidene diisocyanate, heptylidene diioscyanate and heptylidene isothiocyanate, for example. Aliphatic-aromatic compounds include phenylethylene diisocyanate, styrene diisocyanate, allyloxyphenyl isocyanate and the like. Cycloalkylene derivatives include cyclopentylene diisocyanate, 1,4-diisocyanatocyclohexane, cyclohexylene-1,2-diisothiocyanate and the like.

Polyisocyanates and isothiocyanates which include hetero atoms include, for example 1,2,3,4-tetraisocyanatobutane, 2-chloro-1,3-diisocyanatopropane,

$SCN(CH_2)_3S(CH_2)_3NCS$ and the like.

Derivatives of the above described polyisocyanates and polyisocyanates, in which an excess of the isocyanate or isothiocyanate moiety has been used, include reaction products with compounds containing a plurality of hydroxyl, primary amino, secondary amino, carboxyl, amide, sulfhydryl and the like, and groups which contain an active hydrogen under the conditions of the bonding. These groups might include lactones, active methylene groups, enolizable compounds like some ketones, and the like.

Of particular interest because of relative cheapness and easy availability would be the reaction products of toluene diisocyanate, hexamethylene diisocyanate, diphenylmethane diisocyanate, and triphenyl methane triisocyanate with polyols such as, for example, glycerol, ethylene glycol, diethylene glycol, triethylene glycol, tetraethylene glycol, propylene glycol, dipropylene glycol, tripropylene glycol, styrene glycol, propylene glycols: polyethylene glycols; 2-methyl pentane diol-2,4; 2-ethylhexanediol-1,3; diethylene glycoldiricinolenate; polyethylene glycol ricinoleates; butylene glycol-1,3 and 2,3; sucrose, triethanolamine, castor oil, monoglycerides of lauric, stearic and oleic acids, lard fatty acids, hydrogenated lard fatty acids, cottonseed fatty acids and the like. The aforementioned reaction products include a substantial number of polyurethanes which are suitable for use as adhesive coatings or primer coatings in accordance with this invention. In fact, the polyurethanes having terminal isocyanate groups are all satisfactory adhesives or primer coating materials suitable for use in this invention.

In carrying out this invention, the adhesive or primer coating material can be applied to either of the surfaces to be bonded. Thus, the adhesive coating can be applied as a thin layer to the surfaces oxidized or other coating-receptive polyolefin surface and the adhesive layer then contacted with the film or coating which is to be bound thereto. Where the coating-receptive surface of polyolefin is to be joined to another film material, the adhesive may be applied as a thin layer to the other material and the adhesive surface then contacted with the polyolefin surface. While this invention is primarily concerned with the use of the adhesives described above for purposes of laminating solid materials, I have previously shown in my United States Patent 3,005,728 that surfaces coated with adhesives of the type described above are adherent to films of other resinous materials whether applied as solid coherent films or in liquid form as a coating which upon drying or solidification forms a composite laminated material. In that patent, I have also shown that the adhesive surface is adherent to other synthetic resins such as polyvinyl and polyvinylidene resins, and acrylic resins. The preferred form of the invention, however, is concerned with the bonding of a surface-oxidized polyolefin to a polymeric material having active hydrogen therein which is capable of reacting with the reactive groups in the adhesive.

The invention in greater detail as to both products and mechanics of the method is further described in the following illustrative examples:

Example 1

The use of various type solvents of varying volatility for the surface-oxidized polyethylene adhesion was tried using a solution of toluene diisocyanate as the adhesive. Two types of polyethylene, one surface-oxidized at room temperature for five seconds and the other for five minutes, were used. Saturated sodium dichromate in concentrated sulfuric acid was the oxidant. Adhesion was done both in the presence and absence of a mixture of a catalyst and an accelerator. The catalyst consisted of a benzene solution of 0.85 percent orthophenanthroline and 0.1 percent manganese naphthenate. The adhesive was present in solution in concentrations of seven to four percent. Two drops of the adhesive and two drops of the catalyst solution were spread on a six-inch square section of polyethylene, the adhesive first. A few seconds interval was allowed between the adhesive and the catalyst solutions for solvent to evaporate. The treated polyethylene was placed on regenerated cellulose film, smoothed, and the Great Lakes sealer placed on it. The Great Lakes sealer had a Teflon-covered heating surface, was a square four inches on a side, and weighed about one kilogram.

The bonds were tested by rapid and slow stripping or attempted stripping of the polyethylene from the cellulose in the dry state and after a three-hour tap water boil of the laminate. Rapid stripping removed the four-inch strip in 0.3 second. Slow stripping took about five seconds for removal. Wet adhesion was a little less than dry adhesion, but similar.

Example 2

A polyethylene glycol with an average molecular weight of 6,000 was heated above its melting point and added to 0.61 gram of toluene diisocyanate dissolved in 10 milliliters of toluene. About 10.5 grams of the glycol was used. Heat was evolved in the reaction. The reaction product was dissolved in 300 milliliters of toluene and this solution was used as an adhesive for bonding together surface-oxidized polyethylene and regenerated cellulose. The general procedure of Example 1 was used. A ten-second heating at 120° C. without catalyst was used. A five-second oxidized polyethylene did not adhere, but one- and five-minute oxidized polyethylene formed bonds stronger than the two-mil polyethylene in the dry and wet states.

The laminates formed were somewhat turbid. The bonding seemed to be better than that achieved with one percent solutions of the pure diisocyanate, even though the concentration of active isocyanate groups could not be over 0.15 percent in the solution.

Example 3

A 0.1 percent manganese naphthenate solution in toluene was the catalyst when toluene diisocyanate was the adhesive. A 7 percent solution of adhesive was used. Two drops of catalyst and adhesive were used for eight square inches. Sealing for ten seconds at 82° C. was tried. The five-minute surface-oxidized polyethylene film regenerated cellulose bond was stronger when dry than the polyethylene and after three-hour boil the bond was stronger than the polyethylene in 10 percent of the cases.

Example 4

The conditions of Example 3 were followed except that a 60-second heating time was used. The strength of bond after the three-hour water boil was improved so that it was stronger than the polyethylene in 50 percent of the cases.

Example 5

The conditions of Example 3 were followed except that benzene was used as the solvent. A ten-second heating time at 100° C. was used. The resulting bond on a five-second oxidized polyethylene was stronger than the film in the dry state and stronger than the film in 20 percent of the cases in the wet state after the three-hour boil.

Example 6

Example 5 was repeated except that only a five-second heating on a five-minute oxidized polyethylene was used. The bond strength was greater than the polyethylene in both the dry and wet states after a three-hour tap water boil. The volatility of the benzene as the solvent in Examples 4 and 5 was such that the polyethylene was apparently dry when the regenerated cellulose and polyethylene were placed together.

Example 7

A five percent solution of triphenylmethanetriisocyanate in dimethylformamide was used to adhere five-minute oxidized polyethylene to regenerated cellulose film. One drop of manganese naphthenate solution and three drops of the adhesive were used for ten seconds at 100° C. The bonds obtained were stronger than the polyethylene dry but after the three-hour tap water boil the bond was weaker than the polyethylene although no sloughing took place.

Example 8

Five-tenths mole (87.5 grams) of toluene diisocyanate was placed in a beaker. Twenty-nine and a half grams (0.25 mols) of molten hexamethylene glycol was slowly added to the diisocyanate with cooling to keep the temperature down. A considerable amount of heat was evolved and the mass became solid on cooking. When warmed to about 60° C., the mass could be dissolved in benzene. A 50 percent solution was made. The solution also solidified on cooling.

A preliminary trial indicated that appreciable bonding could be achieved between five-minute oxidized polyethylene and regenerated cellulose using a 0.1 percent solution of the adhesive spread three drops for six square inches. Dry strength was greater than the polyethylene but wet strength after a one-hour boil was weaker than the polyethylene although it did not permit sloughing.

Example 9

Regenerated cellulose film with no glycerol in it was laminated with five-minute, surface-oxidized polyethylene using a five percent solution of the adhesive developed in Example 8. Three drops of this adhesive solution per eight square inches was applied. No catalyst was used. The bond was heated for 10 seconds at 100° C. The dry strength was greater than the strength of the two-mil polyethylene film. The wet strength after 3 hours in boiling water was greater than the polyethylene strength in 30 percent of the area.

Example 10

Regenerated cellulose film containing eight percent titanium dioxide and no glycerol was treated similarly to Example 9. While dry bond strength was greater than that of the polyethylene, after three-hour water boil the bond strength was less in all cases although still considerable.

Example 11

The adhesive of Example 8 was diluted to 2.5 percent with acetone and used to adhere five-second oxidized polyethylene to normal cellulose under the conditions of Example 9. Dry bonding was greater than the strength of the polyethylene. Wet bonding after three-hour water boil was greater than the strength of the polyethylene in about 20 percent of the area of the bonds.

Example 12

When a five-minute oxidized polyethylene was adhered to regenerated cellulose film under the conditions of Example 11, exactly similar results were obtained.

Example 13

A one percent solution of the adhesive of Example 8 was made up in acetone. This was used to adhere five-minute oxidized polyethylene to regenerated cellulose. Dry adhesion was stronger than the polyethylene. After the three-hour tap water boil, the film could be removed from the cellulose with about 30 percent stretching. No sloughing was noted.

Example 14

A five-minute oxidized polyethylene was adhered to cellulose using a 0.1 percent solution of the adhesive of Example 8 in acetone and the procedure of Example 9. Dry adhesion was stronger than the polyethylene. There was no sloughing when the laminate was boiled as usual and removal of the polyethylene gave rise to about 20 percent stretching.

As a control, acetone was spread over the same type of polyethylene and a "bond" was formed. Adhesion in the dry state was less than the strength of the polyethylene, although appreciable. Upon placing the "laminate" in boiling water, sloughing apart was noted in ten minutes or less.

Example 15

A cellulose derived from the denitration of cellulose nitrate was obtained. It was used to adhere to five-minute, surface-oxidized polyethylene using both pure toluene diisocyanate and the adhesives of Example 8. A ten-second heating at 100° C. was used in both cases.

When a seven percent solution of toluene diisocyanate in benzene was used, the dry adhesion was greater than the strengh of the polyethylene.

When a 2.5 percent solution of the adhesive of Example 8 in acetone was used, adhesion in both the dry state and after three-hour tap water boil was greater than the strength of the polyethylene.

Example 16

A paper made mainly of bast fibers with no inorganic loading was used to adhere to five-minute surface-oxidized polyethylene using a 2.5 percent of the adhesive of Example 8, a heating time of 10 seconds and a temperature of 100° C. The attempts to remove the polyethylene from the paper in both the dry and wet conditions caused substantial amounts of fiber to stick to the polyethylene.

Example 17

A white loaded paper was used similiarly to the above. In this instance, fibers remained attached to the polyethylene in both the dry and wet states.

Example 18

Ten percent potassium permanganate and five percent sulfuric acid water was made up, and two-mil polyethylene was treated with this solution at 30° C. for five minutes. A brown film formed on the polyethylene. The resulting film was washed in hydrochloric acid solution to remove the manganese dioxide or other reduction material, washed in deionized water, and dried at a low temperature. The polyethylene was hydrophilic and showed binding of methylene blue dye. When a 0.1 percent solution of the dye was used to stain the modified polyethylene under alkaline conditions, the staining was about twice as intense as that observed with five-minute dichromate oxidized polyethylene dyed under the same conditions and washed.

Example 19

The permanganate surface-oxidized polyethylene was used to adhere to regenerated cellulose using the 2.5 percent of adhesive of Example 8. A ten-second heating at 95° C. was used. Dry adhesion was stronger than the polyethylene in both slow and rapid stripping or attempted stripping apart of the laminate. Adhesion after a three-hour tap water boil was stronger than the polyethylene in the case of 10 percent of the area.

*Example 20*

The permanganate surface-oxidized polyethylene was used to laminate to regenerated cellulose using a seven percent solution of toluene diisocyanate in acetone as adhesive. A ten-second heating at 95° C. was used. Both dry adhesion and wet adhesion after the boil were stronger than the polyethylene. The bonds showed no evidence of excessive clouding after one day.

*Example 21*

The permanganate surface-oxidized polyethylene was adhered to regenerated film containing no glycerol. Adhesion was achieved by using a seven percent solution of toluene diisocyanate in acetone. A heating time of ten seconds at 100° C. was used. Adhesion was stronger than the polyethylene in the dry state and stronger than the polyethylene over about 20 percent of the area afer the three-hour tap water boil.

It is conceivable that some of the methods of oxidizing the surface of the polyethylene could be carried so far as to interfere with or make more difficult the heat sealing of the film but this difficulty can be obviated by a simple expedient: the polyethylene can be oxidized to contain active hydrogen groups on one side only.

*Example 22*

To illustrate the foregoing facts, two-mil polyethylene film was oxidized on one side by floating it on the surface of concentrated sulfuric acid saturated with sodium dichromate. Oxidation was for ten seconds at 40° C. Laminates were made with regenerated cellulose using a seven percent toluene diisocyanate solution in acetone. Bonding was done using ten seconds of heating at 95° C. The resulting laminates showed stronger bonds than the strength of the polyethylene in both the dry and boiled conditions.

As a check, attempts were made to obtain bonding to the other side with cellulose using the same procedure as above. No bonding resulted. The treated polyethylene showed methylene blue bonding on one side and not on the other.

*Example 23*

The polyethylene modified on one side as above was used to laminate to regenerated cellulose using the adhesive of Example 8 in three percent concentration in acetone. A ten-second bonding at 95° C. was used. The resulting bond was stronger than the polyethylene both in the dry state and after the three-hour tap water boil.

*Example 24*

White bandage cotton cloth weighing about 8.2 grams per square foot was obtained as both bleached and desized cloth. This cloth was used for bonding to surface-oxidized polyethylene by means of the polyisocyanates described above.

Bleached cotton cloth was laminated with one-minute surface-oxidized polyethylene with a five percent solution of toluene diisocyanate in toluene. The bond was formed by heating for ten seconds at 120° C. The dry strength was less than the polyethylene. No sloughing was noted during the tap water boil. Bond strength after the tap water boil was less than that of the polyethylene. The adhesion was achieved with the sealer described in Example 1.

When the oxidized polyethylene was heated while in contact with the cotton fabric both with and without spreading toluene over the polyethylene, a dry bond was obtained. This bond, however, was lost completely during the hot water boil.

*Example 25*

Both the bleached and desized cotton cloths were treated in 16 percent glycerol at 60° C. so that they contained 13 percent glycerol when they had been dried. The cloths were thus treated so that the effect of glycerol could form an urethane-type adhesive in situ.

The desized cotton cloth containing glycerol was laminated with five-second surface-oxidized polyethylene using a five percent solution of toluene diisocyanate in toluene. The adhesive was spread on the polyethylene and the bonding accomplished at 120° C. for ten seconds. Dry bonding was enough to stretch the polyethylene 20 percent as it was removed from the cellulose. Adhesion after the water boil was less than the strength of the polyethylene, but no sloughing was noted.

*Example 26*

Desized cotton cloth laminated to one-minute surface-oxidized polyethylene gave similar results to the above in the dry states when laminated under the same conditions. The wet adhesion was such that the polyethylene was stretched about 30 percent when it was stripped from the cotton cloth. When bleached cotton cloth containing glycerol was treated similarly, similar results were obtained.

*Example 27*

Additional strips of regenerated cellulose were laminated with polyethylene surface-oxidized by the submersion for twenty minutes in concentrated sulfuric acid saturated with potassium dichromate using diphenylmethanediisocyanate and triphenylmethanediisocyanate as adhesives. The former was available as a green-yellow solid, normally liquid but readily supercooled, containing about 85 percent o factive isocyante. The latter was supplied as a purple solution in methylene dichloride of 20 percent concentration. Neither seemed to be completely soluble in toluene at a 5 percent concentration so the dispersion was vigorously shaken before application with a glass rod at the rate of about three drops per six square inches. Adhesion was done with ten-second heating with the sealer being at 108° C.

From the foregoing examples and from other related experiments applying three drops of the adhesive on an area of six to eight square inches, it has been established that both polar and non-polar solvents can be used in the adhesive, the bonding with polar solvents being generally superior. Acetone, propylene oxide and acetonitrile, in particular, were suitable, the diffusion of these through polyethylene film being less than when non-polar solvents were used. However, even with non-polar solvents, the problem of diffusion is minimized by the fact that the solvents generally volatilize to a considerable extent during the interim between application of the adhesive to the film and lamination thereof.

The use of solutions of the adhesives are generally desirable in that they permit easy control of even very thin films of the adhesive. By the use of relatively dilute solutions such as 5 percent or less, it is possible to apply very thin films of controlled thicknesses. This is important in the practice of the invention because only very small amounts of these adhesives are necessary to give excellent water-insensitive bonds of the surface-oxidized polyethylene to the cellulosic materials. In the adhesion of such polyethylene to very smooth surfaces such as that on a good regenerated cellulose film, a layer on the order of five or less molecules thick is completely adequate. Heavier layers are employed, of course, and this is especially true if the surfaces to be joined are not smooth and additional adhesive is necessary to fill the valleys and cover the peaks as well. In selecting amounts and concentrations of adhesive, consideration should be given to the possibility that higher concentrations of adhesives in solution produce an adhesive layer that is too thick for maximum adhesion, the thicker layer being more likely to have flaws in the bond. For example, bonding was excellent at adhesive concentrations from a little less than 1 percent up to about 5 percent. The adhesive layer in this range is thin enough to be efficient and thick enough to minimize the number and area of those scattered places not covered by the adhesive.

In the practice of this invention, the adhesive layer which is applied to the surface-oxidized polyethylene or other polyolefin is generally used as an undercoating or primer coating for the immediate lamination of the product to another material or the application of a coating thereto. However, the adhesive-coated polyolefin can be considered as an intermediate product in itself and can be stored and used at a later time for preparation of a coated or laminated product.

The polyethylene comprising one lamina of the present invention is defined as being surface-oxidized, it being necessary that the polyethylene contain active hydrogen which can be produced in the film by an oxidation procedure severe enough to give rise to active-hydrogen-containing groups within the surface layers of the polyethylene. These active-hydrogen-containing groups are available to the adhesive used in bonding the polyethylene to the cellulosic or other polymeric material containing active hydrogen by chemical reaction therewith.

In addition to those oxidants defined and described above, there are others such as calcium, sodium and other hypochlorites, free hypochlorous acid, mixtures of hypochlorite and chloride in acid media, free bromic acid, and chromates and bromates in acid media.

As employed here to describe the nature of the hydrogen in the cellulose material, the term "active" describes a sodium replaceable hydrogen as ascertained by ion exchange, base binding or the Zerewitinoff methods. It is to be particularly noted that such a material is not producible by oxidation processes carried to the carbonyl, aldehyde or like stage which may give the film surface polar properties. Following are illustrative examples employing calcium hypochlorite in surface treating of polyethylene:

*Example 28*

One-tenth molar (14.3 g.) of calcium hypochlorite of reagent grade was dissolved in one liter of deionized water. Some polyethylene film was added and 50 ml. of concentrated hydrochloric acid at room temperature. The mixture was permitted to brew for five minutes and the film washed with tap water. The film resulting showed considerable active hydrogen activity. When it was bonded to regenerated cellulose film for ten seconds at 108° C. using a 3 percent solution of the adhesive of Example 9, a bond stronger than the polyethylene was obtained.

*Example 29*

Fourteen and three-tenths grams of calcium hypochlorite was dissolved in 400 ml. of water. Polyethylene film was added to the mixture and the solution acidified with 15 ml. of concentrated nitric acid. The mixture was allowed to stand for twenty minutes at room temperature. The film resulting was washed with tap water and could be bonded to regenerated cellulose film with a bond stronger than the polyethylene using the process of the invention.

*Example 30*

Fourteen and three-tenths grams of calcium hypochlorite was dissolved in 600 ml. of water. Polyethylene film was added and 20 ml. of 50 percent sulfuric acid. The film was allowed to oxidize in the solution for five minutes at room temperature. Water insensitive adhesion to cellulose film was possible using 5 and 10 second heating times at 100° C. using 3 percent solution of the adhesion of Example 8.

To further illustrate the area of application of the concepts of the invention to other materials, surface-oxidized polyethylene can be adhered to incompletely substituted cellulose derivatives such as the nitrate, sulfate, acetate, propionate and other esters, to ethers such as the methyl and ethyl ethers which in commercially available form are incompletely substituted, to polyvinyl alcohol and its incompletely substituted derivatives, to basic and acid polymers like polyacrylic acid, copolymers thereof and polymers of basic monomers such as aminoethylmethacrylate, and to natural proteins such as wool, wilk, fur, hair, albumin, casein, gelatin, zein and the like. Along with the other materials mentioned earlier, these are polymeric materials containing appreciable amounts of active hydrogen. Illustrations of these applications are to be found in the following illustrative examples bonding 2-mil polyethylene film oxidized by the action of concentrated sulfuric acid saturated with potassium dichromate. Testing of the bond was by stripping of the polyethylene at a speed of about one foot per second, the polyethylene having a Scott test strength of about two grams at break extensions of about 600 percent.

*Example 31*

A 1" x 2½" piece of ethyl cellulose (about 60 percent substituted) five mils thick was applied to a five-second oxidized polyethylene film carrying two drops of five percent toluene diisocyanate in toluene after the toluene had evaporated. The bond was heated with the sealer described in Example 1 for five seconds, the surface temperature of the sealer being 104° C.

Dry bond strength as judged by rapid stripping of the polyethylene was less than the strength of the polyethylene, although the film stretched about 30 percent as it was removed. When the several laminates were placed in boiling tap water for one and a half hours, they did not slough apart and the bond strength seemed about equal to the dry strength.

Dry strength was tested as soon as the laminates had cooled to room temperature. Wet strength was tested as soon as the water-soaked laminates had cooled to room temperature after removal from the boiling tap water.

*Example 32*

The conditions of Example 31 were repeated except that a ten-second heating period was used. The ten laminates which were made showed greater strength in both the dry state and after the tap water foil. In four of the cases, the adhesive bond was stronger than the tensile strength of the polyethylene used at the speed of the test employed.

*Example 33*

Polyvinyl alcohol sheeting about one-sixteenth inch thick was adhered to one-minute surface-oxidized polyethylene using two drops of a 5 percent solution of toluene diisocyanate in toluene per three square inches of film. Dry adhesion was appreciable but less than the polyethylene film strength, allowing 30 percent stretching on removal. The wet adhesion could not be tested because of the formation of gel from the polyvinyl alcohol in hot water.

*Example 34*

Although no satisfactory bonding was obtained between cellulose acetate and either five-second or one-minute surface-oxidized polyethylene when toluene diisocyanate in toluene solution was employed, the same materials formed a satisfactory bond when a 3 percent solution of the adhesive of Example 8 was used. Furthermore, the same materials formed a very satisfactory laminated film when manganese naphthenate was added. Two-tenths gram of solid "10.5 percent manganese" manganese naphthenate was dissolved in 20 ml. of toluene and 1 ml. of toluene diisocyanate added to make the adhesive. Two drops of the catalyzed adhesive per three square inches of the polyethylene resulted in a bond between the polyethylene and cellulose acetate that was stronger than the polyethylene in about 20 percent of the area. Adhesion in both wet and dry state was the same, no sloughing being noted after a three-hour boiling in tap water.

*Example 35*

The powder apparently used to prevent blocking was wiped from the surface of polyvinyl butyral, a light yellow rubbery film about 14.5 mls. thick. Strips 1½" x 2" were bonded to one-minute surface-oxidized polyethylene with two drops of 5 percent toluene diisocyanate-toluene solution. Heating for ten seconds at 106° C. produce a bond which in both dry state and after a three-hour boiling in tap water was stronger than the polyethylene in 20 percent of the area and of substantial strength in the remainder of the area.

*Example 36*

Two drops of a 5 percent toluene diisocyanate in toluene solution was coated on a 1" x 3" piece of one-minute oxidized polyethylene. This in turn was placed on a cellulose acetate-butyrate film 1.1 mils in thickness and heating was at 106° C. Dry strength of the bond was such that about 30 percent stretching of the polyethylene occurred in separating the laminate. No sloughing took place during the tap water boil.

*Example 37*

A 4 percent solution of high viscosity sodium alginate was made by vigorous stirring of the alginate in water. After allowing most of the dispersed air to escape, the solution was converted to a calcium alginate-alginic acid mixture containing free carboxyl groups by casting a film of the sodium alginate on a glass plate and placing it in a calcium chloride solution containing acid containing 500 g. anhydrous calcium chloride, 50 ml. of glacial acetic acid and 1500 ml. of water. The dry thickness of the film was 2 mils, the films being coagulated for five minutes at 30° C., water washed and air dried to contain about 10 percent water. Using a 5 percent solution of toluene diisocyanate in toluene as the adhesive with heating for ten minutes at 106° C., a dry adhesion greater than the strength of the polyethylene was obtained.

*Example 38*

Although no adhesion was obtained between surface-oxidized polyethylene and an unsupported film of either cellulose acetate-propionate (16 percent propionyl) or cellulose acetate-butyrate (16 percent butyryl), excellent adhesion resulted using the same conditions with supported films of these mixed esters. The esters were cast on glass plates and air-dried at room temperature for ten minutes, and the plates were then placed in a 115° C. oven for twenty minutes. Strips of one-minute oxidized polyethylene coated with two drops of 5 percent toluene diisocyanate in toluene per 3 square inches were placed on the ester film while it was still on the hot glass plate, the laminate being removed from the plate after it had cooled for about ten minutes to room temperature. Dry adhesion for both esters was greater than the strength of the 2-mil polyethylene with some diminution in bond strength after a one-hour water boil which caused no sloughing.

*Example 39*

Cellulose nitrate containing an average of 10.7 percent nitrogen and a viscosity of SS 6.2 seconds was obtained. Ten percent solutions of this material were a slight beige color in acetone. When films were cast from the acetone onto glass plates and air-dried, they were somewhat translucent. The films were used in adhesion trials.

Approximately two-mil dry thickness films were cast from the cellulose nitrate and allowed to air dry for about one hour at room temperature. These films contained about 30 percent acetone. They were used to adhere to one-minute surface-oxidized polyethylene using a 5 percent solution of toluene diisocyanate in toluene as adhesive at two drops per three square inches.

Adhesion was accomplished at 106° C. for ten seconds. Dry adhesion was appreciable but was less than the strength of the polyethylene in all of the six laminates tested. It was found, however, that the adhesion after a three-hour boil was greater than the strength of the polyethylene in half the area.

Additional films were air-dried for one hour and oven-dried for thirty minutes at 115° C. When these film laminates were made and tested in a way similar to the above, the bond strength was stronger than the polyethylene in all cases in both the dry and water boiled states.

*Example 40*

Botany wool flannel which was white-yellow in color but which contained no weighting agents was adhered to five-minute surface-oxidized polyethylene film.

The adhesive was a urethane-type compound containing excess isocyanate groups. It was made by adding 0.25 mole of melted (60° C.) hexamethylene glycol to 0.5 mole of pure toluene diisocyanate. Heat was evolved and the reaction product solidified. It was dissolved in an equal weight of benzene at higher temperatures. This 50 percent solution in benzene was dissolved in acetone to make a 3 percent solution which was the adhesive.

One drop per two square inches of polyethylene of adhesive was used. The polyethylene was bonded to the wool using a ten-second heating period at 105° C. Dry adhesion was less than the strength of the polyethylene, but the adhesion was about the same after a three-hour tap water boil.

A control "laminate" was made by spreading the same amount of solvent on the polyethylene and subjecting it to the conditions of the experiment. Some dry adhesion was noted, but the "laminate" sloughed apart in tap water after twenty minutes of boiling.

No pressure beyond the weight of the sealer was employed in this experiment so that the actual area of contact between the film and the fabric was much less than the apparent area.

*Example 41*

Incompletely substituted ethyl cellulose film 1.1 mils thick was adhered to five-minute surface-oxidized polyethylene using the polyurethane adhesive of Example 40.

The cellulose ether was adhered by heating ten seconds at 108° C. A 5 percent solution in acetone of the adhesive was used two drops per four square inches.

On six laminates dry strength was appreciable but less than the strength of the polyethylene. When the laminates were boiled in tap water for three hours, the strength of the cooled laminate bond was greater than the polyethylene in about 50 percent of the area of the bond.

*Example 42*

Slightly yellow, transparent, three-mil films which were made mostly of the amylose fraction of starch were obtained. They did not seem to contain glycerol although they were flexible. They varied somewhat in thickness.

The adhesive of Example 40 was used as a 4 percent solution in acetone. It was spread, one drop per two square inches, on a one-minute oxidized polyethylene. The solvent was flashed off. The polyethylene was adhered to the amylose film for ten seconds at 108° C.

Dry adhesion was greater than the strength of the polyethylene. After a three-hour tap water boil, the bond strength was greater than the strength of the polyethylene.

*Example 43*

Twenty grams of zein from corn, assaying about 90 percent protein and containing 0.6 percent ash and 0.8 percent oil, was dissolved in a mixture of 100 ml. of 98 percent isopropyl alcohol and 5 ml. of deionized water. The zein was stirred to dissolve it, and 5 ml. of the monoethylether of diethylene glycol was added as a plasticizer. Two-mil films were cast on a glass plate first coated with a silicon oil, the films being air-dried at room temperature for one hour and then oven-dried at 110° C. for twenty minutes. A 4 percent solution of the adhesive of Example 40 in acetone was spread on the polyethylene at the rate of one drop per two square inches and bonding done at 108° C. for twenty seconds to effect a bond stronger than the polyethylene in the dry state. The protein absorbed large amounts of water in hot water so that adhesion in the wet state after a three-hour boil could only be classified as stronger than the zein gel.

The lamination process of the invention involves heat, pressure, and contact time concepts. Pressure-temperature and time-temperature relationships are essentially of inverse orders, pressure being particularly beneficial when lamination is carried out at room temperature and below. Generally, temperatures may be from somewhat below room temperature to above the softening point of the polyethylene which softening point will go as high as 135° C. depending on the nature of the polyethylene. By catalysis the reaction bonding the laminates is further facilitated as evidenced in the examples. Suitable catalysts of the amine type are tertiary amines such as N-methylmorpholine, triethylamine, triisobutylamine, tripropylamine, 3-diethylaminopropylamine and the like. As examples of the paint drier type of catalysts particulraly suitable for isocyanate bonding in amounts varying from 0.01 to 1.0 percent are the cobalt, manganese, lead, iron, vanadium, copper, cerium, chromium, uranium, nickel and tin salts of the high molecular weight organic acids such as oleic, stearic, myrisitic, linoleic and naphthenic or other alicyclic acids.

The adhesives to be used can be coated on either the second material or on the surface-oxidized polyethylene before bringing the two together prior to bonding. As a related concept, the adhesive may be a reaction product of diisocyanate, diisothiocyanate or their equivalents and a polyfunctional compound containing a plurality of functional groups reactive with the diisocyanate, the diisothiocyanate or equivalents being present in excess in the preferred ratio of two molecules to one of the polyfunctional compounds. Examples of this are found in the use of glycerol, polyethylene glycol, or hexamethylene glycol as well as the polycarboxylic acids, hydroxy acids, polyfunctional compounds containing one or more amine groups, polyols and polyhydroxy phenols, for example. When using a polyfunctional compound as an adhesive ingredient, it is possible to apply a diisocyanate or its equivalent as a coating to both the surface-oxidized polyethylene and the second material to be joined, the adhesive being then formed in situ by the polyfunctional compound as the coated surfaces are brought together.

From the foregoing description of my invention, it can be seen that laminates have been developed which, with particular regard to lamination of polyethylene and other recited film-forming materials, will have particular utility in the food packaging field. By an adhesive laminate of as low as 0.05 ml. in thickness, a superior packaging material is provided which has suitable moisture vapor permeability properties with no loss in heat sealability. The laminates or coated products which are prepared in accordance with this invention have the laminae bonded by a very strong adhesive bond which is resistant to aging or to delamination as shown by the extended boiling water tests set forth in the several examples above.

While I have described my invention with special emphasis upon several preferred embodiments, I wish it to be understood that within the scope of the appended claims the invention may be practiced otherwise than as specifically described herein. In particular, the invention is applicable broadly to the coating or lamination of various synthetic resins, particularly polymeric active-hydrogen-containing materials, to polyethylene and other polyolefins having an oxidized surface or other coating-receptive surface to which there is adhered an adhesive undercoating or primer coating of a compound having a plurality of —X=C=Y groups wherein X is C or N, Y is O, S or NR, and R is hydrogen or a monovalent hydrocarbon radical.

What is claimed is:

1. The process of bonding polyethylene having an oxidized surface containing active hydrogen to a polymeric material containing active hydrogen which comprises applying a thin adhesive coating to at least one of said surfaces to be bonded, one of said surfaces being the oxidized polyethylene, said adhesive coating comprised essentially entirely of compound having a plurality of —X=C=Y groups wherein X is selected from the group consisting of C and N and Y is selected from the group consisting of O, S and NR wherein R is selected from the group consisting of hydrogen and monovalent hydrocarbon radicals, and, after contacting said adhesive with the other surface to be bonded, reacting said compound with said contacting surfaces to form a strong water insensitive bond therebetween.

2. A process according to claim 1 in which the active hydrogen-containing material is a cellulosic material.

3. A process according to claim 1 in which the adhesive is selected from the group consisting of diisocyanates, diisothiocyanates, and mixed isocyanate-isothiocyanates.

4. The process of bonding polyethylene to a polymeric material containing active hydrogen which comprises oxidizing a surface of said polyethylene sufficiently to produce base exchange capacity in said surface, applying a thin adhesive coating to at least one of the surfaces to be bonded, one of said surfaces being the oxidized polyethylene, said adhesive coating comprised essentially entirely of organic compound having a plurality of —X=C=Y groups wherein X is selected from the group consisting of C and N and Y is selected from the group consisting of O, S and NR wherein R is selected from the group consisting of hydrogen and monovalent hydrocarbon radicals, and, on contacting said adhesive coating with the other surface to be bonded, reacting said compound with each said contacting surface to form a strong water-resistant bond therebetween.

5. A process according to claim 4 in which the active hydrogen-containing material is a cellulosic material.

6. A process according to claim 4 in which the adhesive is selected from the group consisting of diisocyanate, diisothiocyanate, and mixed isocyanate-isothiocyanates.

7. A process according to claim 5 in which a polyethylene film is bonded to a regenerated cellulose film.

8. A process according to claim 7 in which the adhesive is applied to the surface oxidized polyethylene film and the adhesive then contacted with the regenerated cellulose film.

9. A laminate comprising surface-oxidized polyethylene-containing active hydrogen joined to a polymeric material containing active hydrogen by a water-resistant strong bond which consists essentially entirely of intermediately disposed thin layer of organic compound having a plurality of —X=C=Y groups wherein X in selected from the group consisting of C and N and Y is selected from the group consisting of O, S and NR wherein R is selected from the group consisting of hydrogen and monovalent hydrocarbon radical, and chemically reacted in situ with said surface-oxidized polyethylene and polymeric material.

10. A laminate according to claim 9 in which the active hydrogen-containing material is regenerated cellulose.

11. A laminate according to claim 9 in which the active hydrogen-containing material is polyvinyl alcohol.

12. A laminate according to claim 9 in which the active hydrogen-containing material is amylose.

13. A laminate according to claim 9 in which the active hydrogen-containing material is zein.

14. A laminate according to claim 9 in which the active hydrogen-containing material is an incompletely substituted cellulose ester.

15. A laminate according to claim 9 in which the active hydrogen-containing material is an incompletely substituted cellulose ether.

16. A laminate according to claim 9 in which the active hydrogen-containing material is cotton.

17. A laminate according to claim 9 in which the active hydrogen-containing material is silk.

18. A laminate according to claim 9 in which the active hydrogen-containing material is wool.

19. A laminate according to claim 10 in which the adhesive is the reaction product of hexamethylene glycol and an excess of toluene diisocyanate.

20. A laminate according to claim 11 in which the adhesive is the reaction product of hexamethylene glycol and an excess of toluene diisocyanate.

21. A laminate according to claim 12 in which the adhesive is the reaction product of hexamethylene glycol and an excess of toluene diisocyanate.

22. A laminate according to claim 13 in which the adhesive is the reaction product of hexamethylene glycol and an excess of toluene diisocyanate.

23. A laminate according to claim 14 in which the adhessive is the reaction product of hexamethylene glycol and an excess of toluene diisocyanate.

24. A laminate according to claim 15 in which the adhesive is the reaction product of hexamethylene glycol and an excess of toluene diisocyanate.

25. A laminate according to claim 16 in which the adhesive is the reaction product of hexamethylene glycol and an excess of toluene diisocyanate.

26. A laminate according to claim 17 in which the adhesive is the reaction product of hexamethylene glycol and an excess of toluene diisocyanate.

27. A laminate according to claim 18 in which the adhesive is the reaction product of hexamethylene glycol and an excess of toluene diisocyanate.

28. In a process of bonding active hydrogen-containing polymeric material to a surface of polyethylene which has been subjected to an oxidizer to produce active hydrogen-containing groups therein, the steps comprising applying to at least one of the surfaces to be bonded a thin coating consisting essentially of a diluted solution of adhesive having a plurality of —X=C=Y wherein X is selected from the group consisting of C and N, and Y is selected from the group consisting of O, S and NR, wherein R is selected from the group consisting of hydrogen and monovalent hydrocarbon radicals, to leave on evaporation a thin film essentially of adhesive, and, on contacting the adhesive film with the other surface to be bonded, applying heat and pressure to obtain a water-insensitive strong bond between the polymeric material and polyethylene.

29. In the process according to claim 28, wherein the coating applied to one of the surfaces to be bonded embodies from near 1 to about 5% by weight of the adhesive dissolved in a readily volatilizing solvent.

30. A laminate comprising a thin flexible film of polyethylene having a surface treated with an oxidizer to produce active hydrogen-containing groups therein and bonded to a pliable sheet of active hydrogen-containing polymeric material by an interposed thin layer of essentially adhesive compound reacted in situ therewith, said compound having a plurality of —X=C=Y groups wherein X is selected from the group consisting of C and N, and Y is selected from the group consisting of O, S and NR, wherein R is selected from the group consisting of hydrogen and monovalent hydrocarbon radicals, said layer providing a strong water-insensitive bond therebetween.

31. A packaging material comprising a thin flexible film of polyethylene having an active hydrogen-containing surface bonded to a thin flexible film of active hydrogen-containing polymeric material by an intermediately disposed thinner layer comprised essentially entirely of organic compound reacted in situ therewith, said organic compound having a plurality of reactive —X=C=Y groups wherein X is selected from the group consisting of C and N and Y is selected from the group consisting of O, S and NR wherein R is selected from the group consisting of hydrogen and monovalent hydrocarbon radicals, the bond between said films being resistant to breakdown by boiling water and of a strength at least equal to the thickness of the polyethylene film itself.

32. A method for applying to a polyolefin surface coatings resistant to loss of adhesion upon aging which comprises applying to a coating-receptive polyolefin surface a primer coating of an organic isocyanate containing a terminal isocyanate group —N=C=O and selected from the group consisting of diisocyanates, polyisocyanates, and polyurethanes.

33. In a method for applying to a polyolefin surface a top coating resistant to loss of adhesion, the steps which comprise applying to a coating-receptive polyolefin surface a primer coating comprising a solution in a volatile organic solvent of an organic isocyanate containing a terminal isocyanate group —N=C=O, and selected from the group consisting of diisocyanates, polyisocyanates, and polyurethanes, drying said primer coating, and thereafter applying over said primer coating a top coating of an active-hydrogen-containing synthetic resin.

34. A method according to claim 33 wherein the coating-receptive polyolefin surface is an oxidized polyethylene surface.

35. A method according to claim 33 wherein the primer coating comprises an aliphatic diisocyanate.

36. A method according to claim 33 wherein the primer coating comprises an aromatic diisocyanate.

37. A method according to claim 33 wherein the primer coating comprises a polyisocyanate.

38. A method according to claim 33 wherein the top coating contains polyvinyl alcohol.

39. A polyolefin article having a coating-receptive surface coated with a primer coating of an organic isocyanate containing a terminal isocyanate group —N=C=O, and superimposed over said primer coating, a top coating of an active-hydrogen-containing synthetic resin.

40. A polyolefin article having a coating-receptive surface coated with a primer coating containing an organic isocyanate containing a terminal isocyanate group —N=C=O, and selected from the group consisting of diisocyanates, polyisocyanates, and polyurethanes.

41. The process of bonding a polyolefin having an oxidized surface to a polymeric material containing active hydrogen which comprises applying an adhesive coating to at least one of the surfaces to be bonded, said adhesive having a plurality of —X=C=Y groups wherein X is selected from the group consisting of C and N and Y is selected from the group consisting of O, S and NR wherein R is selected from the group consisting of hydrogen and monovalent hydrocarbon radicals, and contacting said adhesive with the other surface to be bonded.

42. The process of bonding a polyolefin to a polymeric material containing active hydrogen which comprises oxidizing a surface of the polyolefin, applying an adhesive coating to at least one of the surfaces to be bonded, said adhesive having a plurality of —X=C=Y groups wherein X is selected from the group consisting of C and N and Y is selected from the group consisting of O, S and NR wherein R is selected from the group consisting of hydrogen and monovalent hydrocarbon radicals. and contacting said adhesive with the other surface to be bonded.

43. A process according to claim 42 in which the active hydrogen-containing material is a cellulosic material.

44. A polyolefin article having a coating-receptive surface coated with an adhesive having a plurality of —X=C=Y groups wherein X is selected from the group consisting of C and N and Y is selected from the group consisting of O, S and NR wherein R is selected from the group consisting of hydrogen and monovalent hydrocarbon radicals.

45. A polyolefin article having an oxidized surface coated with an adhesive having a plurality of —X=C=Y groups wherein X is selected from the group consisting of C and N and Y is selected from the group consisting of O, S and NR wherein R is selected from the group consisting of hydrogen and monovalent hydrocarbon radicals.

46. A laminate comprising a polyolefin having a coating-receptive surface joined to a polymeric material containing active hydrogen by an adhesive having a plurality of —X=C=Y groups wherein X is selected from the group consisting of C and N and Y is selected from the group consisting of O, S and NR wherein R is selected from the group consisting of hydrogen and monovalent hydrocarbon radicals.

47. A laminate comprising a polyolefin having an oxidized surface joined to a polymeric material containing active hydrogen by an adhesive having a plurality of —X=C=Y groups wherein X is selected from the group consisting of C and N and Y is selected from the group consisting of O, S and NR wherein R is selected from the group consisting of hydrogen and monovalent hydrocarbon radicals.

References Cited by the Examiner
UNITED STATES PATENTS

| | | | |
|---|---|---|---|
| 2,430,479 | 11/47 | Pratt et al. | 161—190 X |
| 3,023,126 | 2/62 | Underwood et al. | 117—76 |
| 3,024,216 | 3/62 | Smitmans et al. | 117—138.8 X |

FOREIGN PATENTS 581,279   10/46   Great Britain.

RICHARD D. NEVIUS, *Primary Examiner.*